E. C. ROBERTS.
Instrument for Measuring Distance and Altitude.
No. 165,616.  Patented July 13, 1875.
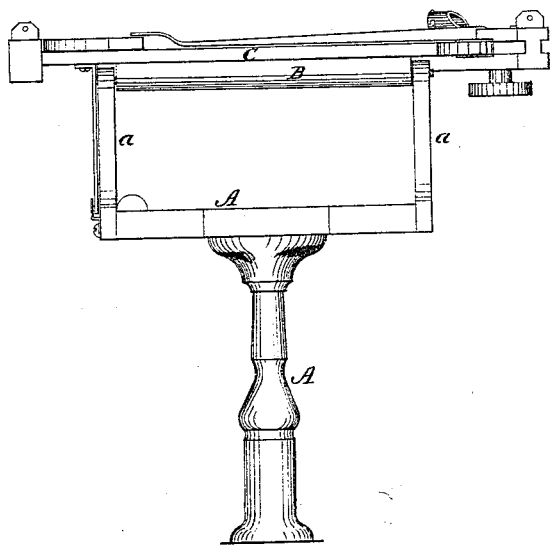
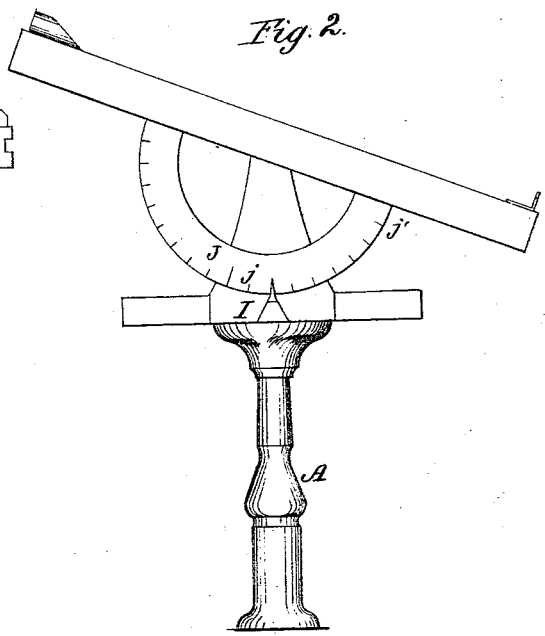
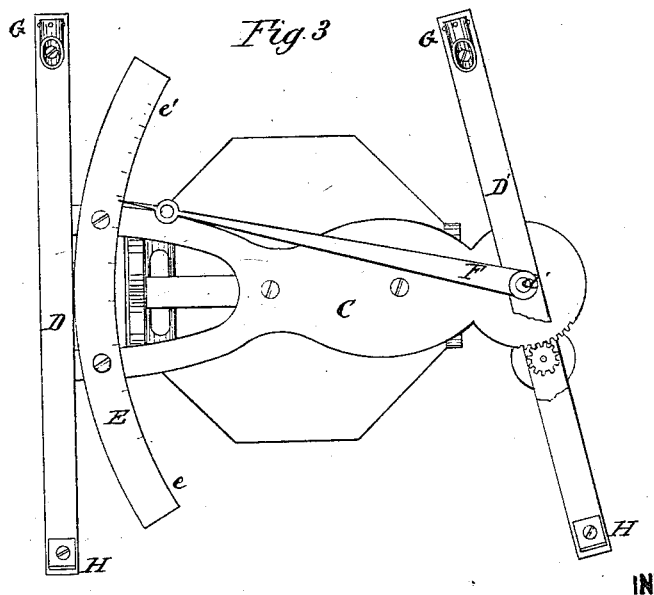

UNITED STATES PATENT OFFICE.

EDWARD C. ROBERTS, OF BROADFORD, VIRGINIA.

IMPROVEMENT IN INSTRUMENTS FOR MEASURING DISTANCES AND ALTITUDES

Specification forming part of Letters Patent No. 165,616, dated July 13, 1875; application filed June 9, 1875.

*To all whom it may concern:*

Be it known that I, EDWARD C. ROBERTS, of Broadford, in the county of Smyth and State of Virginia, have invented a new and Improved Instrument for Measuring Distances and Altitudes; and I do hereby declare that the following is a full, clear, and exact description of the same, reference being had to accompanying drawing forming a part of this specification, in which—

Figure 1 is a front elevation. Fig. 2 is a side elevation. Fig. 3 is a plan view.

The invention relates to devices employed for the purpose of measuring distances and altitudes without the labor and delay of making calculations.

It will first be described in connection with drawing, and then pointed out in the claim.

A represents any suitable stand provided with standards $a\ a$, in which is pivoted or journaled a shaft, B. To the latter is rigidly fastened a bar or plate, C, on opposite sides of which are placed two parallel bars, D D', the former made fast, and the latter turning on a center-pin, $d'$. E is a plate on the arc of a circle, whose center is the pin $d'$, and F a pointer on a radius of the same circle. G is a telescope on the rear end of each arm, D D', and H a sight on the front end.

In order to get the distance of an object I first sight it with the rigid arm D, and then turn the movable arm D' until it is also in line therewith. This enables me to get the data by which the distance is calculated. These distances are then marked on the arc-plate E, beginning for the minimum at $e$, and ending for the maximum at $e'$, each being located in a line indicated by the pointer F. Thus it will be seen that I can afterward always find the distance exactly, or very approximately, without making any calculation.

On the bottom of standard $a$ I place a stationary pointer, I, under which revolves the edge of a semicircular plate, J, attached to the oscillating plate C.

In order to get the altitude of a distant object I have the hypothenuse of the right-angled triangle, obtained as above, together with the indicated angle of inclination, thus leaving nothing unknown but the two sides of the triangle, of which one is the altitude. This being obtained by calculation, and others in the same manner, the altitude of an object at each angle is marked upon the face of arc-plate J exactly opposite the pointer I, beginning for the minimum at $j$, and ending for the maximum at $j'$.

Thus it will be perceived that with this simple portable instrument I can ascertain the altitude and distance of an object in a few moments with little trouble, and with reasonable accuracy.

I am aware that there is nothing new in the process of obtaining the sides and angles of the triangle, and the calculations by which the measurements are made.

Having thus described my invention, what I claim as new is—

1. An instrument for measuring altitudes and distances, consisting of a pivoted plate, C, bars D D', notched arc-plates E J, and pointers F I, the bar D' turning in a horizontal, and the arc-plate J in a vertical, plane, as shown and described.

2. The combination, in a measuring instrument for finding altitude, with a bar, D, oscillating in a vertical plane, of a notated arc-plate, J, and stationary pointer I, as shown and described.

EDWARD C. ROBERTS.

Witnesses:
 SOLON C. KEMON,
 CHAS. A. PETTIT.